Figure 1:
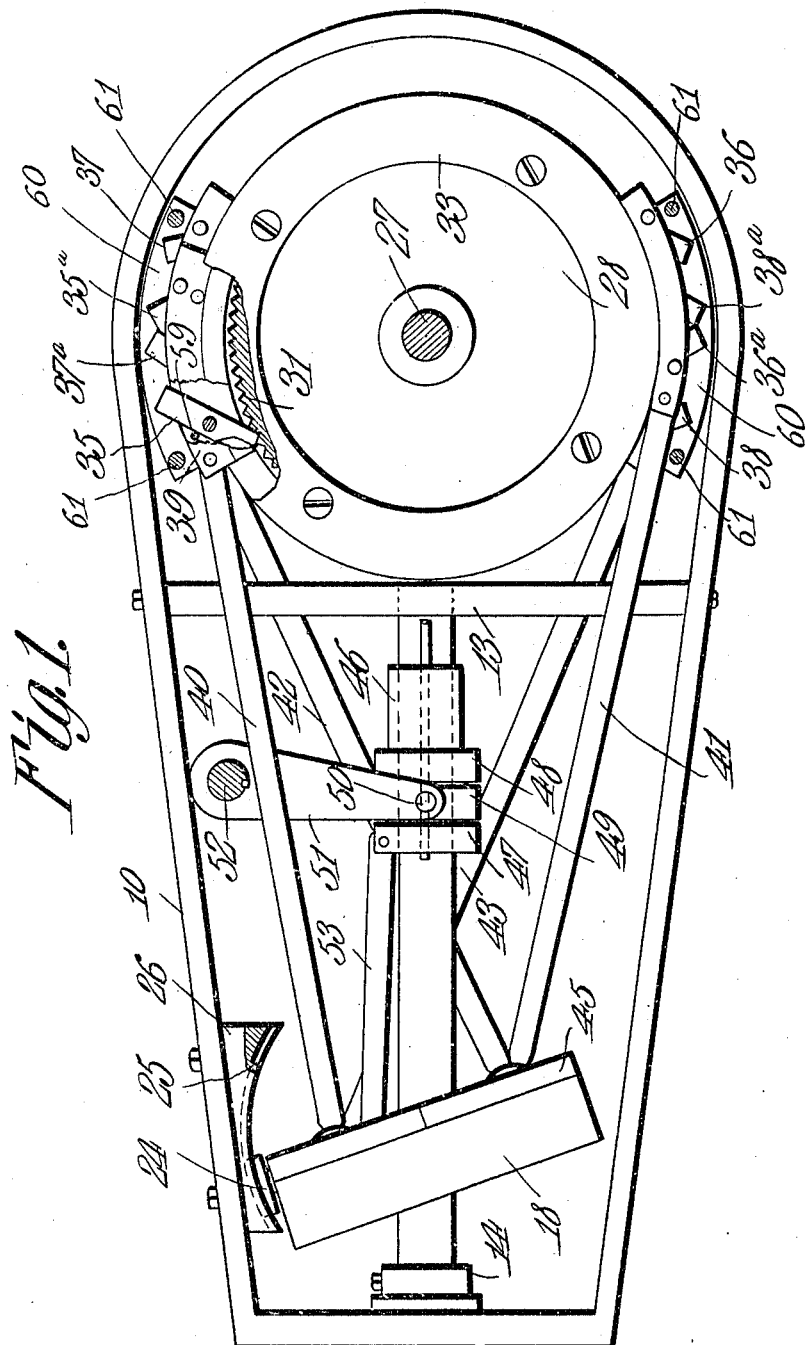

M. J. ROBINSON.
TRANSMISSION GEAR.
APPLICATION FILED APR. 26, 1909.

953,233.

Patented Mar. 29, 1910.
3 SHEETS—SHEET 1.

Witnesses
E. J. Stewart
M. A. Schmidt

Inventor
Major J. Robinson
By C. A. Snow & Co.
Attorneys

M. J. ROBINSON.
TRANSMISSION GEAR.
APPLICATION FILED APR. 26, 1909.
953,233.
Patented Mar. 29, 1910.
3 SHEETS—SHEET 2.
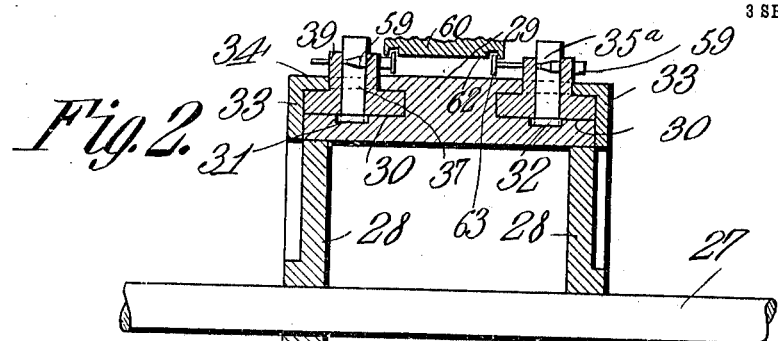
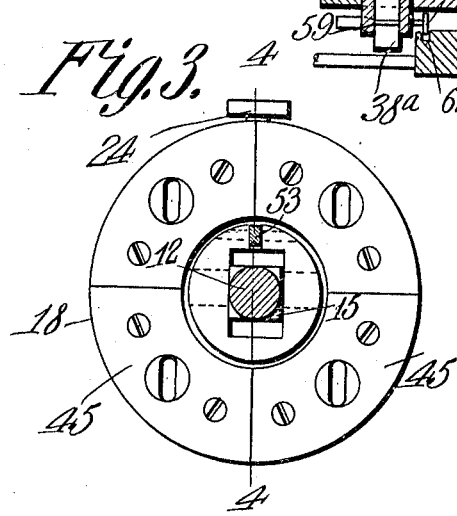
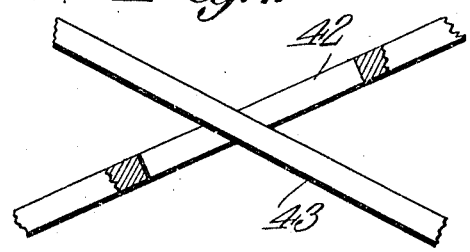
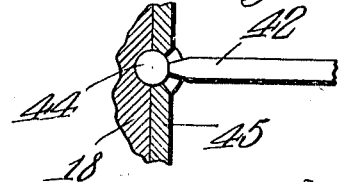
Witnesses
Inventor
Major J. Robinson
By C. A. Snow & Co.
Attorneys

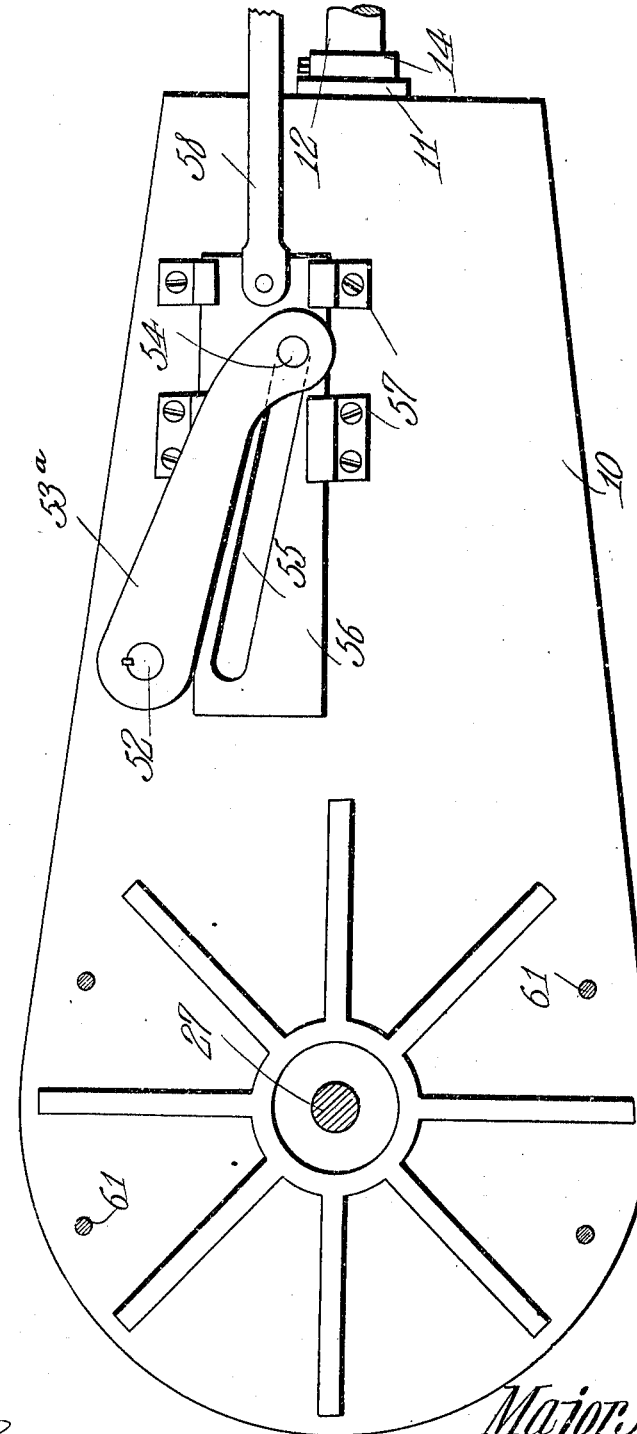

UNITED STATES PATENT OFFICE.

MAJOR J. ROBINSON, OF LONGBEACH, CALIFORNIA.

TRANSMISSION-GEAR.

953,233.   Specification of Letters Patent.   Patented Mar. 29, 1910.

Application filed April 26, 1909. Serial No. 492,214.

*To all whom it may concern:*

Be it known that I, MAJOR J. ROBINSON, a citizen of the United States, residing at Longbeach, in the county of Los Angeles and State of California, have invented a new and useful Transmission-Gear, of which the following is a specification.

This invention relates to improvements in transmission mechanism characterized by a pawl and ratchet mechanism operatively connected to the driven shaft, and which mechanism is actuated by a ring set obliquely on the drive shaft, the object of the invention being to provide a mechanism of the kind stated which is simple in construction, and reliable in operation.

Another object of the invention is to provide a reverse and change speed mechanism which can be easily operated, and with the foregoing objects in view the invention consists in a novel construction and arrangement of parts to be hereinafter described and claimed, reference being had to the drawings hereto annexed forming a part of this specification in which drawings—

Figure 1 is an elevation of the mechanism, partly broken away, the cover of the casing which incloses the same being shown removed. Fig. 2 is a vertical sectional view of the ratchet drum of the driven shaft. Fig. 3 is a face view of the oblique ring. Fig. 4 is a vertical section on the line 4—4 of Fig. 3. Fig. 5 is a sectional detail showing the connection between the oblique ring and one of the pitmen which actuate the pawl. Fig. 6 is an elevation of one side of the casing inclosing the mechanism showing the mechanism for operating the speed changing device. Fig. 7 is a detail of a pair of pitmen hereinafter referred to.

Referring more particularly to the drawings 10 denotes a casing of suitable size and shape which incloses the mechanism to be hereinafter described. One of the end walls of the casing has a bearing 11 in which the drive shaft 12 is supported. This shaft extends into the casing, and on the inside of the latter is a bearing 13 for supporting the end of said shaft. On the shaft are thrust collars 14 which engage the ends of the bearing 11 and serve to prevent longitudinal movement of the shaft. Within the casing 10, the drive shaft 12 has a squared portion 15 on which loosely fits a collar 16, the bore of the collar being shaped to conform to said squared portion, and by means of a pin 17 passing transversely through the collar and through the squared portion of the shaft, said collar is pivotally mounted on the shaft in such a manner that it may be set obliquely thereto for a purpose which will be presently described.

The collar 16 is loosely encircled by a ring 18 formed on one side with an annular flange 19 which is interiorly screw-threaded to receive a ring 20. Between this ring 20 and the ring 18 is received a disk 21 formed integral with the collar 16 on one side thereof, whereby the ring 18 is prevented from slipping off the collar 16. Between the disk 21, and the rings 18 and 20, are interposed anti-friction balls 22, said parts being formed with ball races. In order to prevent rotation of the ring 18 with the collar 16, said ring carries a stem 23, the end thereof projecting from the ring being fitted with a roller 24 which works in a groove 25 made in a block 26 secured to the wall of the casing 10 on the inside thereof, this groove being curved to conform to the path described by the roller when the ring is in operation.

The collar 16 is adapted to be swung on its pivot 17 so as to set obliquely on the shaft 12, by reason of which position of the collar it is given a wabbling movement as the shaft 12 is rotated, which wabbling movement is transmitted to the ring 18, said ring, however, not rotating by reason of the engagement of the roller 24 with the groove 25. This wabbling movement of the ring 18 is utilized to operate a pawl and ratchet mechanism for actuating the driven shaft.

The driven shaft is indicated at 27. On said shaft is fixedly mounted a drum comprising heads 28, and a periphery 29, the latter being formed with undercut grooves 30. The bottom of each groove is formed with ratchet teeth indicated at 31 and 32 respectively. Two ratchet surfaces are therefore provided the purpose of which is to enable the drum to be rotated in opposite directions as will be presently described. The undercut grooves 30 are formed by shaping the periphery 29 to form one side of said grooves, and the other sides thereof are formed by annular plates 33 secured to the heads of the drum and having an inwardly directed peripheral flange 34. The ratchet 31 is engageable by pawls 35 and 36, the former engaging the top of the ratchet, and the latter the bottom thereof, said pawls being arranged so that one pulls and the other pushes when they are in action. The top of the ratchet 31 is also engageable by a pawl 35ᵃ, and the bottom of said ratchet by a pawl 36ᵃ, said pawls being also arranged so that one of them pulls and the other pushes. This last mentioned pair of pawls however is arranged reversely with respect to the pawls 35 and 36, so that said pawls 35 and 36 will rotate the drum in one direction, whereas the pawls 35ᵃ and 36ᵃ will rotate the drum in the opposite direction. The ratchet 32 is engaged in a similar manner by pawls 37, 37ᵃ; and 38, 38ᵃ. Each pair of pawls is mounted in a housing comprising a pair of cheek plates 39, said plates being suitably shaped to fit the grooves 30, and the pawls being pivotally mounted between the plates. The housing of the pawls 35, 35ᵃ is connected to a pitman 40, and the housings of the pawls 36, 36ᵃ; 37, 37ᵃ; and 38, 38ᵃ are operatively connected to pitmen 41, 42 and 43 respectively. The pitmen are connected to the ring 18 so that when the hereindescribed wabbling motion of said ring takes place, the housings of the pawls are reciprocated, and the pawls are thus actuated, whereby through the ratchets 31 and 32, the drum, and, consequently, the driven shaft 27 are rotated.

A ball and socket joint between the pitmen and the ring 18 is had, one face of the ring being formed with sockets to receive the spherical ends 44 of the pitmen, said ends being retained in the sockets by means of a plate 45 secured to the face of the ring, said plate having openings suitably shaped to receive the said spherical ends of the pitmen. The plate is preferably formed in four sections, a section being thus provided for each pitman. The pitmen 40 and 41 run straight to the drum, and the pitmen 42 and 43 are crossed, one running through a slot in the other.

On the drive shaft 12 is splined a sleeve 46 having collars 47 and 48. These collars are fast on the sleeve, and on said sleeve between said collars is loosely mounted a collar 49 which is engageable on opposite sides by pins 50 carried by a yoke 51 secured on a shaft 52 extending transversely through the casing and mounted in the walls thereof. The collar 47 is connected by a link 53 to the collar 16, the connection being a pivotal one, and as said collar 47 is fast on the sleeve 46, it will be seen that upon shifting said sleeve back and forth on the drive shaft 12, the collar 16 will be swung on its pivot 17, and its obliquity with respect to the shaft 12 may thus be varied. The sleeve 46 is shifted on the shaft 12 by the engagement of the yoke 51 with the collar 49, and the said yoke is operated by rocking the shaft 52. Said shaft is actuated by a crank arm 53ᵃ secured thereto on the outside of the casing and carrying at its extremity a pin 54 which works in an oblique slot 55 made in a plate 56 which is slidably mounted in guides 57 secured to the wall of the casing 10. To the plate 56 is connected an operating rod 58. Upon sliding the plate 56 back and forth in its guides by means of the rod 58, the engagement of the pin 54 with the slot 55 swings the crank 53ᵃ and rotates the shaft 52, whereupon the yoke is actuated to shift the sleeve 46.

In use, the shaft 27 is set in motion when the collar 16 is swung on its pivot 17 to extend obliquely with respect to the drive shaft 12, whereupon it is given a wabbling motion which is transmitted to the ring 18, and through the pitmen to the pawl and ratchet mechanism. The stroke of the pitmen is directly proportionate to the obliquity of the collar 16 and the ring 18, in view of which the speed of the driven shaft can be readily varied by adjusting said collar and ring so as to vary the angle of obliquity thereof, which is readily done by shifting the sleeve 46 back and forth on the shaft 12. When the collar 16 and the ring 18 are swung so that their axes extend parallel with the axis of the shaft 12, the collar 16 rotates without a wabbling movement, and the pitmen therefore remain stationary so that the pawl and ratchet mechanism is out of action. The driven shaft therefore is readily stopped by shifting the collar 16 and ring 18 to this position, and it is started when said parts are again set obliquely on the shaft 12. The stroke of the pitman is the smallest fraction of an inch at first, and increases as the obliquity of the collar and ring increases, and the speed of the drum has the same corresponding increase.

As already described, the pawls are mounted so that one set rotates the drum in one direction, and the other set in the opposite direction, so that by throwing either set of pawls into or out of operation, the driven shaft may be reversed. For thus throwing the sets of pawls into and out of operation, there are provided wedge-shaped pins 59 mounted transversely in the cheek plates 39, and extending across the pawls above their pivots so that when their wider portions engage the pawls, the latter are swung on their pivots into inoperative position and held in such position, and upon withdrawing said portions, the pawls are released and thus left free to operate. The pins are slid back and forth as stated by means of blocks 60 carried by rods 61 mounted in the casing wall, and provided with grooves 62 to receive the heads 63 of the pins. One of these blocks is provided for the pins of the top pawls, and a similar block for the pins of the bottom pawls.

The blocks, as well as their grooves are curved to correspond to the curve described by the cheek plates in their travel when in operation. The pins are so arranged that when the blocks are slid in one direction the pawls will be set to rotate the drum in one direction, whereas when slid in the opposite direction, the pawls will be set to reverse the drum.

What is claimed is:

1. In a transmission mechanism, a drive shaft, a driven shaft, a collar mounted obliquely on the drive shaft, and rotatable therewith, a ring loosely encircling the collar, and held against rotation thereon, a drum mounted on the driven shaft, and having an under-cut groove in its periphery, the bottom of the groove being formed with ratchet teeth, a housing slidably mounted in the groove, a pawl carried by the housing, and a connection between the housing and the ring for operating the pawl.

2. In a transmission mechanism, a ratchet drum, a set of pawls for rotating the drum in one direction, a set of pawls for rotating the drum in the opposite direction, housings carrying the pawls, means for operating the pawls connected to the housings, headed wedge-shaped pins carried by the housings, and engageable with the pawls for throwing either set out of operation, and means for operating the pins comprising a sliding block having a groove to receive the heads of the pins.

3. In a transmission mechanism, a drum having an under-cut groove in its periphery, the bottom of the groove being formed with ratchet teeth, a housing slidably mounted in the groove, a pawl carried by the housing, and means for operating the pawl connected to the housing.

In testimony that I claim the foregoing as my own, I have hereto affixed my signature in the presence of two witnesses.

MAJOR J. ROBINSON.

Witnesses:
C. J. WALKER,
J. C. DOUGLASS.